(12) United States Patent
Garcia et al.

(10) Patent No.: US 7,566,221 B2
(45) Date of Patent: Jul. 28, 2009

(54) SEALING DEVICE FOR A GAS INLET TO AN OVEN OR THE LIKE

(75) Inventors: Jean-Michel Garcia, Villeurbanne (FR); Olivier Petitjean, Saint Laurent d'Agny (FR); Eric Sion, Lingolsheim (FR)

(73) Assignee: Messier-Bugatti, Velizy-Villacoublay (FR)

( * ) Notice: Subject to any disclaimer, the term of this patent is extended or adjusted under 35 U.S.C. 154(b) by 0 days.

(21) Appl. No.: 11/674,323

(22) Filed: Feb. 13, 2007

(65) Prior Publication Data
US 2007/0204848 A1 Sep. 6, 2007

(30) Foreign Application Priority Data
Feb. 14, 2006 (FR) .................................. 06 50528

(51) Int. Cl.
*F27B 7/24* (2006.01)
(52) U.S. Cl. .................... 432/115; 277/903; 432/200
(58) Field of Classification Search ................. 432/115, 432/117, 198, 200; 277/903, 906, 916
See application file for complete search history.

(56) References Cited

U.S. PATENT DOCUMENTS

| 3,194,589 | A | * | 7/1965 | Bohls et al. ................... 285/49 |
| 3,706,482 | A | * | 12/1972 | Crockett ..................... 384/618 |
| 4,199,154 | A | * | 4/1980 | Mueller ...................... 277/420 |
| 5,384,015 | A | * | 1/1995 | Schroter et al. ............. 202/251 |
| 6,464,493 | B2 | * | 10/2002 | Polino et al. ................. 432/115 |
| 7,255,372 | B2 | * | 8/2007 | Bertholin et al. ............. 285/106 |

FOREIGN PATENT DOCUMENTS

| DE | 103 12 650 B3 | 9/2004 |
| FR | 2 509 452 A1 | 1/1983 |
| JP | 61 253319 | 11/1986 |
| JP | 05 272708 | 10/2003 |
| WO | WO 95-16803 | 6/1995 |
| WO | WO 03/056059 | 7/2003 |

OTHER PUBLICATIONS

Patent Abstracts of Japan, vol. 018, No. 051, Jan. 26, 1994, for JP 05 272708.
Patent Abstracts of Japan, vol. 011, No. 106, Apr. 3, 1987, for JP 61 253319.
WO Search Report dated May 11, 2007.

* cited by examiner

*Primary Examiner*—Gregory A Wilson
(74) *Attorney, Agent, or Firm*—Cabinet Beau De Lomenie

(57) ABSTRACT

A pipe for feeding a gas into an oven, a furnaces, or the like (such as a CVI/CVD oven), and in particular into a reaction chamber structure inside the oven, is provided with a gastight tubular sealing device extending radially outward of the pipe and defining a path that is practically gastight, through which there extends the feed pipe. The tubular sealing device is preferably at least partially flexible in the transverse direction and/or the axial direction so as to accommodate positioning defects between a location situated in the reaction chamber and a location where the gas feed pipe penetrates the oven (which defects may be due, for example, to asymmetrical thermal expansion/contraction).

7 Claims, 2 Drawing Sheets

SEALING DEVICE FOR A GAS INLET TO AN OVEN OR THE LIKE

The present invention relates more generally to ovens, furnaces, treatment chambers, and the like, into which a reagent gas is introduced as part of a treatment step. A particular example of the invention relates to furnaces for chemical vapor infiltration/chemical vapor deposition (CVI/CVD) in which a reagent gas is introduced as part of a method of densifying porous elements, such as porous preforms for friction parts.

BACKGROUND OF THE INVENTION

Overall, the use of ovens, furnaces, treatment chambers and the like into which a reagent gas is introduced as part of a treatment step are known (in the description below, the term "oven" should also be understood broadly as being applicable to furnaces and other treatment chambers of this kind). An example is the method of chemical vapor infiltration in which a precursor reagent gas is introduced into an oven having porous elements placed therein (for example and without limitation, such as porous preforms for brake disks).

In general, a conventional oven comprises an outer oven casing enclosing a work space or reaction chamber into which objects or elements for treatment are placed, a system for causing the reagent gas to flow into and out from the oven, and a heater system for heating at least an internal portion of the reaction chamber.

In known manner, the reagent gas is forced to infiltrate the porous structure of the porous elements. The reagent gas may comprise a hydrocarbon gas such as propane.

In a known example, a reagent gas is introduced into an inside volume defined by a stack of annular preforms for brake disks that are substantially in alignment in a reaction chamber of an oven. Generally, the gas is forced to travel from the inside volume of the stack towards the outside of the stack by diffusing through the porous (e.g. fibrous) structure of the preforms and/or by flowing through gaps between adjacent stacked preforms, as defined by spacers or the like.

At least the inside of the reaction chamber is heated by the heater system. Thus, because of the relatively high temperature of the brake disk preforms, the reagent gas is subjected to pyrolysis and leaves a decomposition product that is deposited on the inside surfaces of the porous structure. By way of example, with a hydrocarbon gas, the decomposition product is pyrolytic carbon, thus obtaining a carbon-containing composite material (such as a carbon-carbon material).

In general, ovens of this type are constituted by a plurality of components that are assembled together by welding, bolting, or the like, so as to define the various units of the assembled structure.

Nevertheless, various structural defects or anomalies are commonplace in the structure of an oven. For example, the component parts may be poorly aligned while the oven is being constructed. In other circumstances, intermittent defects can appear, such as poor alignment between parts due to thermal expansion differences while the oven is in use. This happens for example when different materials having different coefficients of thermal expansion are used in the same assembly. In general, structural defects at those sites lead to clearances, gaps, or the like occurring between the parts, through which external air (which might contain contaminants, for example) can penetrate into the oven, and through which the reagent gas (which amongst other things is usually flammable) can escape.

The location(s) through which the gas is introduced into the oven can present a particular problem, at least concerning the reagent gas which might escape from the gas flow path instead of being conveyed usefully into the zone of the oven where the brake disk preforms or the like are located.

OBJECTS AND SUMMARY OF THE INVENTION

From the above, it can be seen that it is desirable to reduce leaks of reagent gas from the location where the gas is introduced into the oven and into the reaction chamber that is to be found therein. Simultaneously, it is useful for the structure of the oven to conserve its structural suitability for accommodating manufacturing errors and imperfections, and the like.

In general manner, in accordance with the present invention, a flexible tubular sealing device is placed around one end of a gas inlet pipe at a location where the gas inlet pipe enters into the body of the oven, and terminates in the vicinity of a gas inlet opening formed in the reaction chamber.

Preferably, at least a portion of the tubular sealing device is flexible transversely (relative to an axis along which the tubular sealing device extends between the wall of the oven and the gas inlet opening of the reaction chamber), and/or axially. This flexible portion may have a bellows structure, for example. The remaining portion of the tubular sealing device may be comparably rigid. In an example of the invention, the flexible portion of the tubular sealing device is made of stainless steel and presents a thickness that allows the required degree of flexibility, while the remaining portion of the tubular sealing device is made of an Inconel alloy, or the like.

At least the axial end of the tubular sealing device adjacent to the inlet of the gas inlet pipe into the casing of the oven is welded into place so as to further improve the integrity of the gas sealing device.

Consequently, the tubular sealing device as described and claimed herein desirably provides sealing around an end of the gas inlet pipe where it penetrates into the body of the oven and where it terminates in the vicinity of a gas inlet opening formed in the reaction chamber. In addition, the sealing function is maintained in spite of any poor alignment between the gas inlet pipe and the gas inlet opening (e.g. because of defects in construction or installation). Finally, the sealing function is also maintained even if the clearance between the gas inlet pipe and the gas inlet opening varies in operation because different parts of the oven expand by different amounts because they have different coefficients of thermal expansion.

BRIEF DESCRIPTION OF THE DRAWINGS

The present invention can be better understood with reference to the accompanying figures, in which.

DETAILED DESCRIPTION OF THE INVENTION

In general, an oven used for a CVI/CVD process comprises a wall or casing separating the inside of the oven from the outside and defining a volume therein. Inside the volume of the oven there is a reaction chamber structure. The reaction chamber in the CVI/CVD oven may itself define another volume inside the volume of the oven. The articles that are to be treated or modified, such as porous brake disk preforms, are placed in the reaction chamber.

In general, a reagent gas circulation system is provided for introducing the reagent gas into the oven and for removing it therefrom. In particular, the reagent gas is introduced into the reaction chamber inside the oven.

Gas is extracted from the oven by any appropriate mechanism known in the art and/or in the industry, including, but without being limited thereto, by the effect of the gas pressure inside the oven compared with the pressure outside the oven, or by various suction or evacuation mechanisms that are known in the art.

A heater system is arranged to heat at least the inside of the reaction chamber. Heating an oven of this type is generally known in the art. Two particular known examples of heater systems comprise conductive heating and resistive heating.

In order to simplify the present description of the structure, the various passages, pipes, or the like to which reference is made are described while assuming they present a cross-section that is practically circular, however that is not necessarily always true.

Figure 1:
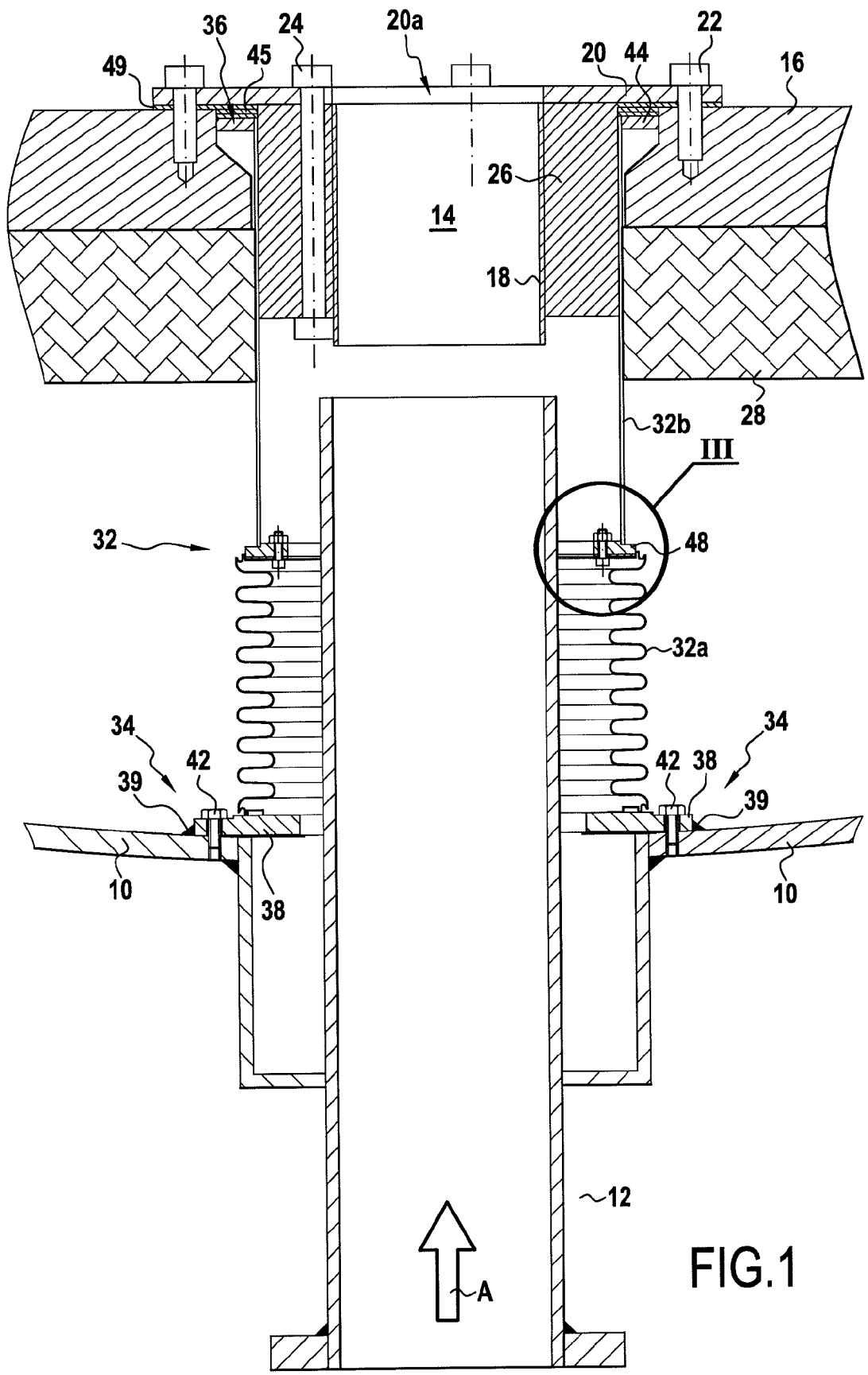
FIG. 1 is a diagrammatic cross-section view of an oven of the present invention, at the location where a reagent gas inlet pipe enters into the body of the oven and terminates in the vicinity of a gas inlet opening formed in a reaction chamber disposed in the body of the oven.

FIG. 1 is a fragmentary cross-section view of the zone where a reagent gas feed pipe 12 passes through the oven wall 10 in order to deliver a flow of reagent gas into the inside of the oven (as represented by arrow A in FIG. 1).

In one possible example, the diameter of the gas inlet passage 14 formed in the reaction chamber 16 can be defined or adjusted by means of an insert. The insert comprises a tube 18 mounted in position and secured or otherwise held relative to an annular assembly plate 20 having a central opening 20a generally in alignment with the tube 18. The assembly plate 20 is in turn secured to a surface of the reaction chamber 16, e.g. by means of bolts 22, as shown in FIG. 1. A conventional insulating material may be placed around a periphery of the tube 18, and more particularly may be present in the form of a plurality of annular layers (not shown) that are held together, e.g. by bolts 24 or the like.

Finally, an outside portion of the reaction chamber 16 may optionally be covered in a conventional thermally insulating material represented overall as a layer 28.

The reagent gas feed pipe is terminated at a location that is at least adjacent to a gas inlet passage 14 formed in the reaction chamber 16. In some configurations, the reagent gas feed pipe 12 may come into contact with the structure defining the gas inlet passage 14, or it may come into abutment thereagainst in some other way. For reasons that are explained below, it may be desirable to keep the reagent gas feed pipe 12 independent from the gas inlet passage 14 (i.e. for them not to be secured to each other), and even to maintain a gap between the reagent gas feed pipe 12 and the gas inlet passage 14.

In accordance with the present invention, a tubular sealing device (given overall reference 32) is provided. The tubular sealing device 32 generally surrounds the transition between the gas feed pipe 12 and the gas inlet passage 14 in circumferential manner and makes it practically leaktight. In order to be able to accommodate the operating conditions inside the oven (in particular concerning temperature), the tubular sealing device 32 is preferably made of metal.

At least a portion of the tubular sealing device 32 is flexible, and more particularly flexible transversely and/or axially relative to an axis along which the tubular sealing device 32 extends. This flexibility compensates for alignment defects or offsets between the gas feed pipe 12 and the gas inlet passage 14, e.g. caused by defects of construction or asymmetrical thermal stresses, as discussed above. Thus, for example, the distance between the terminal end of the gas feed pipe 12 and the reaction chamber 16 (containing the gas inlet passage 14 formed therein) can vary in operation while the inside of the oven is being heated, because of different coefficients of thermal expansion. Consequently, even if a gap of increasing or decreasing size happens to exist between the gas feed pipe 12 and the gas inlet passage 14, or even if they move laterally out of alignment, the overall assembly remains practically isolated in leaktight manner so as to be capable of accommodating various alignment defects and the like.

The tubular sealing device 32 preferably comprises at least two axial segments: a first axial portion 32a that is flexible and a second axial portion 32b that is comparability rigid (compared with the first axial portion).

The first axial portion 32a preferably has a shape and a structure that provide the required flexibility in the transverse and/or axial directions. For example, and as shown in the figures, the first axial portion 32a has a shape of the bellows type.

In an example of the present invention, the first axial portion 32a is made of stainless steel (such as ASME 321) or of Inconel ally, preferably selected to be capable of withstanding temperatures reaching about 500° C. It will be understood that it is also necessary to take account of the thickness of the material so that the required flexibility is obtained.

The second axial portion 32b may merely be tubular, having a shape of cross-section that corresponds to that of the first axial portion 32a so as to provide continuity. In an example of the present invention, the second axial portion 32b may be made of Inconel. Compared with the first axial portion 32a, the second axial portion 32b is more rigid.

As mentioned above, the tubular sealing device 32 is generally in the form of a tubular sheath that is flexible axially and laterally about the transition between the gas feed pipe 12 and the gas inlet passage 14 so as to limit leaks of reagent gas. The tubular sealing device extends generally axially between a location 34 on the inside of the oven wall 10 and a location 36 at least adjacent to the reaction chamber 16, if not contiguous therewith.

In the construction example shown in the figures, the first axial portion 32a is secured to an annular plate 38 by any suitable means providing almost complete sealing relative to the gas passage between the first axial portion 32a and the annular plate 38, e.g. by welding.

The annular plate 38 is securely mounted on the inside of the oven wall 10. Any fastening method can be used that provides good gas-tightness between the annular plate 38 and the oven wall 10, in particular it is possible to use bolts 42 or the like, as shown in the figures. Sealing between the annular plate 38 and the oven wall 10 can be further improved in conventional manner by using sealing rings or the like placed between them, and/or by welding, as shown generally at 39.

At the opposite axial end of the tubular sealing device 32, and by way of example, the second axial portion 32b may terminate merely in an annular ring 44 which can be held in place without being genuinely attached or secured between a surface of the reaction chamber 16 (and/or of the insulating material 28) and an outside surface of the second axial portion 32b.

By way of example, the annular ring 44 may present a surface that comes into abutment against an opposite face of the assembly plate 20. In some configurations, it can be advantageous to interpose one or more sealing rings 45 between the annular ring 44 and the assembly plate 20. By way of example, the sealing rings 45 could be made of graphite. In FIG. 1, only two of these sealing rings 45 are shown for the purposes of illustration. In some configurations, one or more additional sealing rings 49 could also present an outside diameter extending radially outwards so as to be disposed between the assembly plate 20 and the surface of the reaction chamber 16.

In an example of the present invention, the first and second axial portions 32a and 32b that constitute the tubular sealing device 32 are separate portions that are connected in gastight manner to the adjacent axial ends thereof by any conventional method that provides a suitable degree of sealing between the first and second axial portions 32a, 32b.

Figure 2:
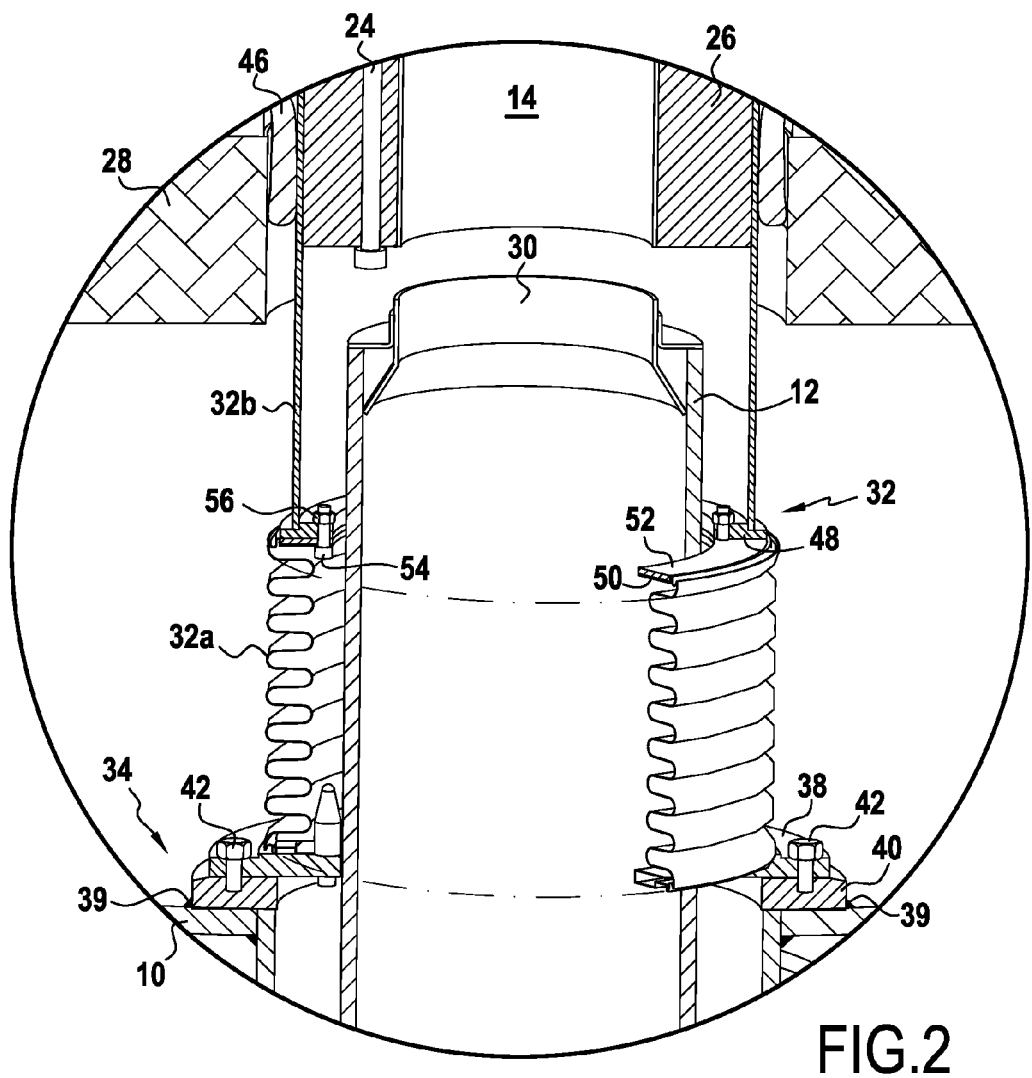
FIG. 2 is an exploded perspective view of the tubular sealing device of the present invention.
Figure 3:
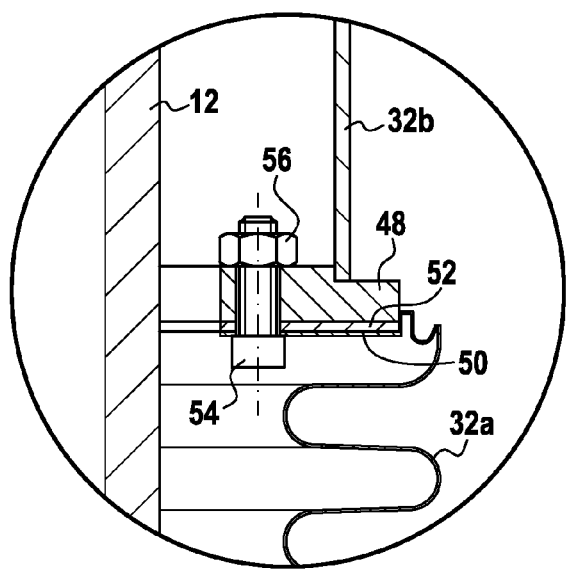
FIG. 3 is a fragmentary view on a larger scale of a connection between first and second axial portions of the tubular sealing device of the invention.

In a particular example, as shown in the figures, the first axial portion 32a (which as described above may be constituted by a relatively thin metal strip, e.g. of stainless steel) may have a flange-forming portion 50 (relative to an axis of the first axial portion 32a) at its end adjacent to the second axial portion 32b (see in particular FIGS. 2 and 3).

In corresponding manner, the second axial portion 32b has a flange or ring 48 extending transversely that is secured thereto in conventional manner, e.g. by welding (which serves in particular to provide effective gas-tightness therebetween.

As shown in the figures, and in particular in FIG. 3, the flange-forming portion 50 and the flange 48 are placed facing each other. A sealing ring 52 (e.g. made of graphite) may be interposed between the respective flanges in order to increase the gastight security between them.

Finally, the flange 48, the flange 50, and the sealing ring 52 between them are held together by a conventional fastening method, e.g. by means of nuts and bolts 54, 56.

Apart from the structure of the tubular sealing device as described above, it is considered that the materials and/or the construction, e.g. of the oven wall 10, of the gas feed pipe 12, of the reaction chamber 16, of the thermal insulation 28, etc. are known in the art. In general, all of the components described above must be capable of appropriately withstanding the operating temperatures usually to be found in the oven during a CVI/CVD process. In particular, the flexible first axial portion 32a must conserve its flexibility throughout a reasonable working lifetime, while taking into consideration the operating temperatures that it encounters in use. Finally, some of the components need to be made of out of materials that are substantially non-reactive (in particular at the above-mentioned high temperatures) so as to avoid interfering with the chemistry of the densification process implemented in the oven.

In desirable manner, the tubular sealing device as described above and as claimed herein is easy to install in an oven and to remove therefrom during maintenance of the oven.

Although the present invention is described above with reference to certain particular examples for the purpose of illustrating and explaining the invention, it must be understood that the invention is not limited solely with reference to the specific details of those examples. More particularly, the person skilled in the art will readily understand that modifications and developments that can be carried out in the preferred embodiments without thereby going beyond the ambit of the invention as defined in the accompanying claims.

What is claimed is:

1. A method of conveying a gas to a gas inlet passage of a reaction chamber provided inside a CVI/CVD oven, the method comprising:
   providing a gas feed pipe that communicates an exterior of the oven with an interior of the oven, the gas feed pipe terminating at least adjacent to a gas inlet passage of the reaction chamber; and
   substantially isolating the gas feed pipe by surrounding the gas feed pipe with a substantially gas-tight tubular sealing device that extends from an interior wall of the oven at a location where the gas feed pipe enters the oven to a location adjacent to the gas inlet passage of the reaction chamber;
   wherein the tubular sealing device is secured in place in a manner so as to provide a substantially gas-sealed path through which the gas feed pipe extends, and wherein at least a part of the tubular sealing device is transversely flexible to accommodate positional differences between the respective ends of the tubular sealing device at the location at which the tubular sealing device is fixed to the oven wall and the location adjacent to the gas inlet passage.

2. A CVI/CVD oven comprising:
   an oven wall defining a volume therein;
   a reaction chamber located within the volume defined by the oven wall, the reaction chamber having at least one gas inlet passage formed therein, through which a reactive gas is introduced into the reaction chamber;
   a gas feed pipe for conveying the reactive gas into the oven and extending through the oven wall to communicate an exterior side of the oven wall with an interior side of the oven wall, the gas feed pipe terminating in the volume defined by the oven wall at an end disposed at least adjacent to the at least one gas inlet passage of the reaction chamber; and
   a tubular sealing device surrounding the gas feed pipe and within which the gas feed pipe extends and having a first end gas-sealingly fixed to a location on an interior surface of the oven wall adjacent to a location at which the gas feed pipe enters the oven, and a second end gas-sealingly fixed to a location adjacent to the gas inlet passage, the tubular sealing device comprising a flexible first axial portion and a relatively rigid second axial portion.

3. An oven according to claim 2, wherein the first axial portion has a bellows structure.

4. An oven according to claim 2, wherein the first axial portion is made of metal.

5. An oven according to claim 2, wherein the first axial portion is made of stainless steel.

6. An oven according to claim 2, wherein the second axial portion of the tubular sealing portion is made of metal.

7. An oven according to claim 2, wherein the second axial portion is made of a nickel-chromium-iron alloy.

* * * * *